(12) United States Patent
Kimura

(10) Patent No.: US 8,412,913 B2
(45) Date of Patent: Apr. 2, 2013

(54) INFORMATION PROCESSING SYSTEM, INFORMATION PROCESSING METHOD, AND PROGRAM

(75) Inventor: Jumpei Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 674 days.

(21) Appl. No.: 12/560,660

(22) Filed: Sep. 16, 2009

(65) Prior Publication Data

US 2010/0070736 A1    Mar. 18, 2010

(30) Foreign Application Priority Data

Sep. 17, 2008    (JP) ................................. 2008-237426

(51) Int. Cl.
*G06F 12/00* (2006.01)
(52) U.S. Cl. ................................. 711/216; 711/E12.018
(58) Field of Classification Search ................... 711/216
See application file for complete search history.

(56) References Cited

U.S. PATENT DOCUMENTS

| 6,801,494 B2 * | 10/2004 | Ross ........................... 369/275.3 |
| 2007/0061584 A1 | 3/2007 | Takashima et al. |
| 2007/0198838 A1 * | 8/2007 | Nonaka et al. ................ 713/176 |

FOREIGN PATENT DOCUMENTS

| JP | 2001-210014 A | 8/2001 |
| JP | 2004-158072 A | 6/2004 |
| JP | 2006-074421 A | 3/2006 |
| JP | 2007-079989 A | 3/2007 |

OTHER PUBLICATIONS

"Advanced Access Content System," *Blu-ray Disc Pre-recorded Book*, Final Revision 0.95, Feb. 24, 2009, pp. 1-3.

* cited by examiner

*Primary Examiner* — Charles Rones
*Assistant Examiner* — Aracelis Ruiz
(74) *Attorney, Agent, or Firm* — Wolf, Greenfield & Sacks, P.C.

(57) ABSTRACT

An information processing system includes: a data processing unit that executes verification processing for a content recorded in a disk and reproduces the disk-recorded content under a condition that the verification succeeds, wherein the data processing unit randomly selects hash units, which are objects of collation, from among a plurality of hash units formed with component data items of the content, reads the selected hash units sequentially from the disk, calculates hash values, and collates the calculated hash values with collation hash values; and the data processing unit executes reading sequence determination processing so as to determine a reading sequence in which the selected hash units are sorted according to recording positions in a disk, and reads the selected hash units according to the determined reading sequence.

17 Claims, 13 Drawing Sheets

FIG.1
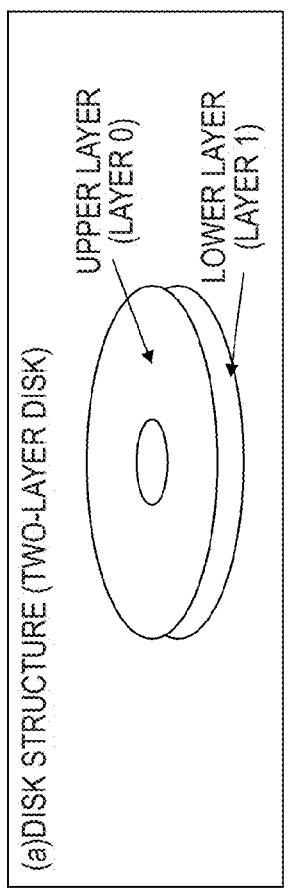
(a) DISK STRUCTURE (TWO-LAYER DISK)
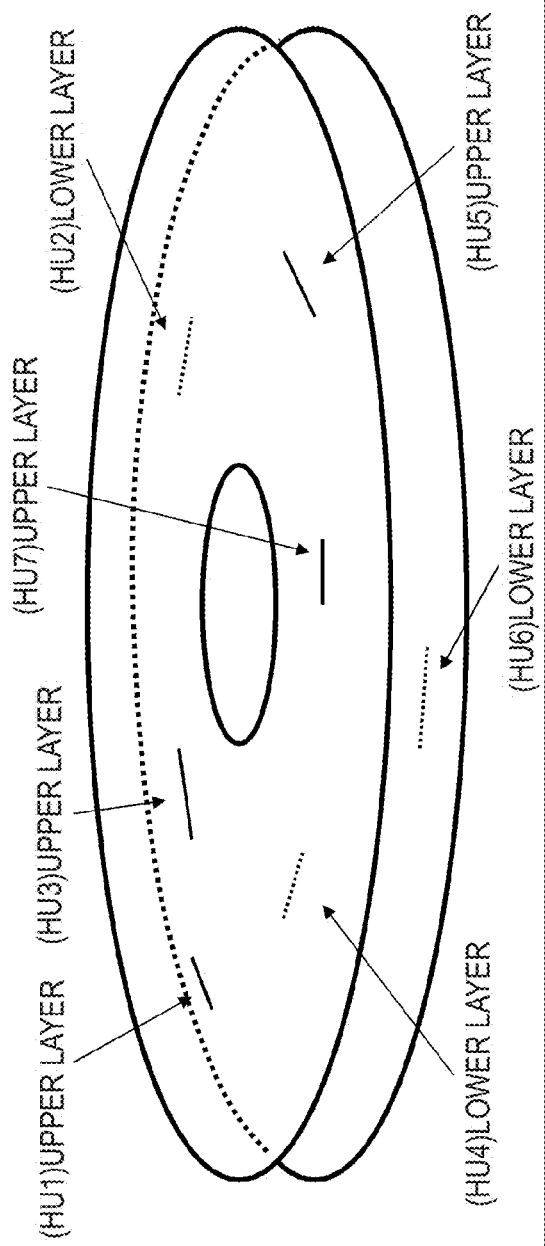
(b) EXAMPLE OF HASH-UNIT READING SEQUENCE

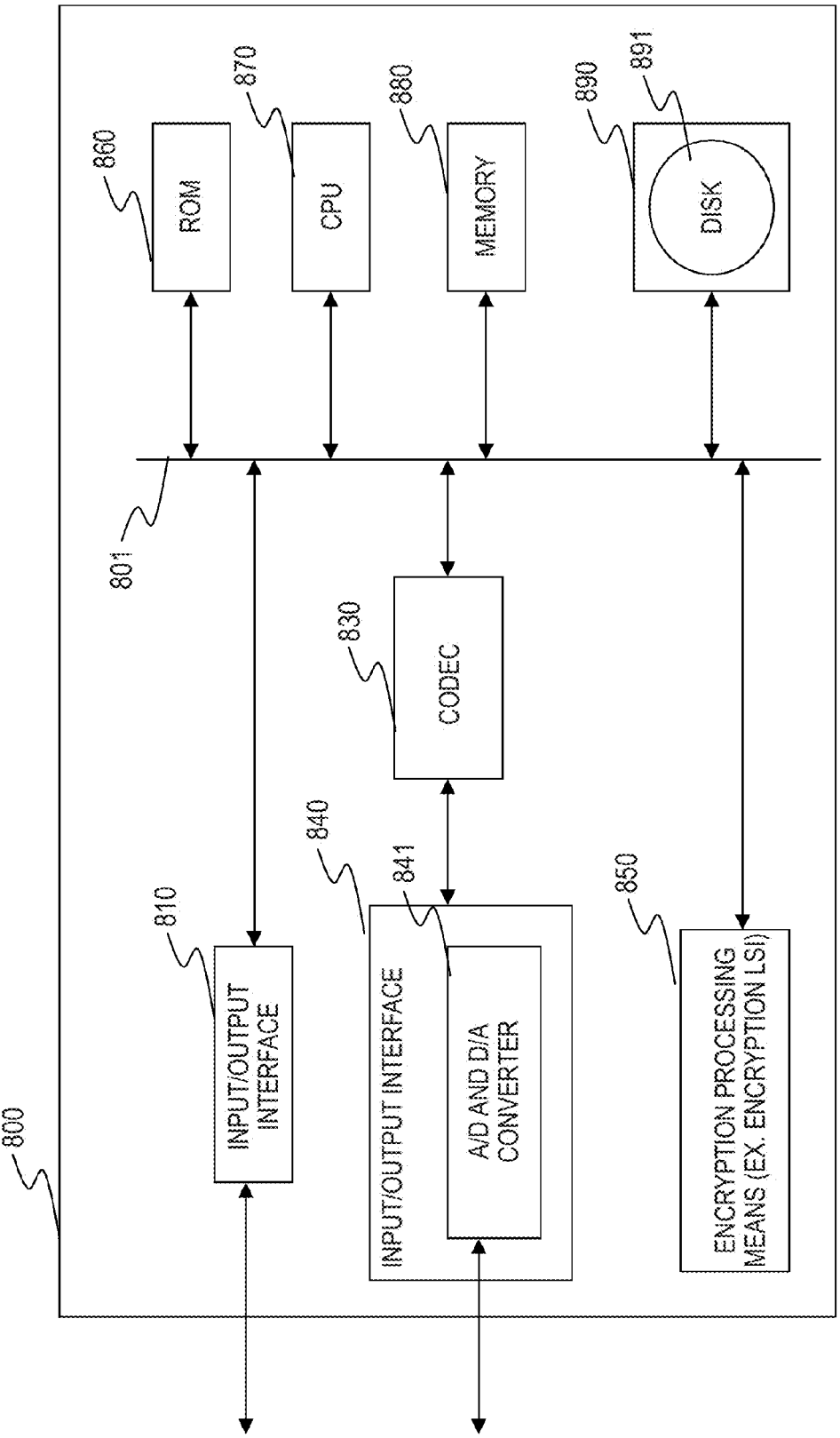

INFORMATION PROCESSING SYSTEM, INFORMATION PROCESSING METHOD, AND PROGRAM

BACKGROUND OF THE INVENTION

1. Field of the Invention

The present invention relates to an information processing system, an information processing method, and a program. More particularly, the present invention is concerned with an information system that verifies a content recorded in an information recording medium, an information processing method, and a program.

2. Description of the Related Art

Disks including a digital versatile disc (DVD) and a Blu-ray Disc (registered trademark) are used as content recording media. For example, a movie content or the like is recorded in disks and provided for users. The disk-recorded content is often a content whose creator or vendor holds a copyright or a distribution right thereon. Various techniques are applied in order to prevent fraudulent use of the content.

As one of techniques for barring fraudulent use of contents, a technique of verifying whether a disk-recorded content has been altered is implemented in an information processing (reproducing) system that executes content reproduction. The information processing system is configured to verify whether a content recorded in a disk has been altered, and extend control so that: only when it is ascertained that the content has not been altered, reproduction of the content will be permitted; and if it is ascertained that the content has been altered, the reproduction of the content will not be executed.

For example, in patent document 1 (JP-A-2007-79989), a configuration in which a hash value is calculated from a content file scheduled to be reproduced, and then compared with a collation hash value recorded in advance in a disk, that is, a collation hash value that has already been calculated based on an authentic content is described.

The configuration is a content usage control configuration in which if the hash values newly calculated based on component data items of the content recorded in the disk square with the collation hash values, a decision is made that the content has not been altered, and reproduction processing to be executed for the content is permitted.

In an advanced access content system (AACS) known as a content copyright management system, a process to be employed in a case where hash values are used to verify a disk-recorded content is stipulated.

In a disk-recorded content conformable to the AACS standards, numerous hash units (HUs) formed with construction data items of the content are defined. For example, several hundreds of hash units to several thousands of hash units are defined in one content. In a disk, verification values associated with the hash units, that is, hash values that have already been calculated from an authentic content are stored as collation hash values.

An information processing system that performs content verification randomly selects several hash units from among numerous hash units, reads component data items (hash units) of the content associated with the selected hash units, calculates hash values from the read hash units, and collates the hash values with the verification values recorded in a disk.

If all of the selected hash units square with the verification values, the disk-recorded content is recognized as an authentic content that has not been altered. The process then proceeds to content reproduction processing. If part of the selected hash units does not square with a counterpart of the verification values, the disk-recorded content is recognized as a content that may be altered. The content reproduction processing is therefore not permitted.

As mentioned above, in content verification processing conformable to the AACS standards, since it takes much time to verify all of several hundreds of hash units to several thousands of hash units with respect to one content, several (for example, seven) hash units are randomly selected in order to perform verification processing.

However, even when several (for example, seven) selected hash units are verified, since the hash units are randomly selected, the selected hash units dispersedly exist at various positions in a disk. Therefore, it takes much time to read the data items of the hash units. This poses a problem in that a standby time which elapses until a content is reproduced gets longer.

For example, assume that the number of hash units to be randomly selected is seven and data items forming the hash units are read in the order in which the hash units are selected. In this case, a head is moved to recording areas of the hash units in the order in which the hash units are selected, that is, so-called seek is executed in order to read the data items. Therefore, depending on the data recording positions of the randomly selected hash units, the seek movement of the head may be a repetition of a movement from the internal circumference of the disk to the external circumference thereof. In this case, a head moving distance increases and data reading processing requires much time.

Further, if a disk is a two-layer disk or has a multilayer structure, the data reading processing requires much more time. As shown in, for example, (a) in FIG. 1, assume that a content stored in the two-layer disk is verified. One content such as a movie is recorded in two layers (an upper layer (layer 0) and a lower layer (layer 1)).

Even when the content recorded in the two-layer disk is verified, hash units that are objects of verification are randomly selected. For example, seven hash units shall be selected as objects of verification. Through random hash unit selection processing, seven hash units (HU1 to HU7) shall be, as shown in (b) in FIG. 1, selected from the upper layer (layer 0) and lower layer (layer 1).

The seven selected hash units (HU1 to HU7) shall be stored at recording positions shown in (b) in FIG. 1 in such a manner that the hash units (HU1, HU3, HU5, and HU7) are disposed in the upper layer (layer 0) and the hash units (HU2, HU4, and HU6) are disposed in the lower layer (layer 1).

Data reading is performed in the order in which the hash units (HU1 to HU7) are randomly selected. First, the hash unit (HU1) is read from the upper layer. Secondly, the hash unit (HU2) is read from the lower layer. Thirdly, the hash unit (HU3) is read from the upper layer. Fourthly, the hash unit (HU4) is read from the lower layer. Thus, recorded data items are read alternately from the upper layer and lower layer. This processing requires not only the seek movement of a head but also refocusing control accompanying layer switching. In this example, the seek and refocusing control have to be repeated multiple times. Eventually, a content verification processing time gets longer.

The example shown in (a) and (b) in FIG. 1 is an example of processing involving a two-layer disk. Even when a single-layer disk having one layer is employed, hash unit reading during which a head has to be reciprocated between the external side of the disk and the internal side thereof is required, though it depends on the results of hash-unit selection. Eventually, a content verification time is extended. Due to the extension of the verification time, beginning of reproduction of a content is delayed. This poses a problem in that a user has to stand by for a long period of time.

SUMMARY OF THE INVENTION

The present invention addresses the foregoing problems. There is a need for an information processing system that is configured to verify a content by randomly selecting hash units formed with component data items of a disk-recorded content, and that realizes a reduction in a content verification processing time by efficiently executing reading of the selected hash units, an information processing method, and a program.

According to a first embodiment of the present invention, there is provided an information processing system having a data processing unit that executes verification processing for a content recorded in a disk, and that performs reproduction of the disk-recorded content under a condition that verification succeeds.

The data processing unit randomly selects hash units, which are objects of collation, from among multiple hash units formed with component data items of the content, reads the selected hash units sequentially from the disk so as to calculate hash values, and collates the calculated hash values with collation hash values.

The data processing unit executes reading sequence determination processing in which the selected hash units are sorted according to the recording positions in the disk thereof, and read the selected hash units according to the determined reading sequence.

Further, according to one embodiment of the present invention, when the selected hash units are dispersedly arranged in multiple layers of the disk, the data processing unit included in the information processing system determines a reading sequence that minimizes the number of times by which an inter-layer movement is made.

Further, according to one embodiment of the present invention, when the selected hash units are dispersedly arranged in one layer of the disk, the data processing unit included in the information processing system determines a reading sequence making it possible to read the selected hash units by making a movement in either of a direction from the internal circumference of the disk to the external circumference thereof and a direction from the external circumference of the disk to the internal circumference thereof.

Further, according to one embodiment of the present invention, the data processing unit retrieves pieces of information on the recording positions in the disk of the selected hash units from file system management information, and determines a reading sequence by performing sort processing to which the acquired pieces of information are applied.

Further, according to one embodiment of the present invention, the data processing unit included in the information processing system retrieves pieces of hash-unit information associated with the selected hash units from a content hash table recorded in the disk, uses the acquired pieces of information to retrieve the recording positions in the disk of the selected hash units from the file system management information.

Further, according to one embodiment of the present invention, the data processing unit in the information processing system retrieves logical sector numbers (LSNs), which are associated with the selected hash units, from the file system management information, and determines a reading sequence by performing sort processing on the logical sector numbers (LSNs).

According to a second embodiment of the present invention, there is provided an information processing method of verifying a disk-recorded content in an information processing system.

The information processing method includes the steps of:
causing a data processing unit to randomly select hash units, which are objects of collation, from among multiple hash units formed with component data items of the disk-recorded content;
causing the data processing unit to sort the selected hash units, which are selected at the hash unit selection step, orderly according to the recording positions in a disk, and determines the order as a hash-unit reading sequence;
causing the data processing unit to read the selected hash units according to the determined reading sequence; and
causing the data processing unit to calculate hash values from the read selected hash units, and collates the calculated hash values with collation hash values.

Further, according to a third embodiment of the present invention, there is provided a program that allows an information processing system to verify a disk-recorded content, and that includes the steps of:
causing a data processing unit to randomly select hash units, which are objects of collation, from among multiple hash units formed with component data items of the disk-recorded content;
causing the data processing unit to orderly sort the selected hash units, which are selected at the hash unit selection step, according to the recording positions in a disk, and determine the order as a hash-unit reading sequence;
causing the data processing unit to read the selected hash units according to the determined reading sequence; and
causing the data processing unit to calculate hash values from the read selected hash units and collate the calculated hash values with collation hash values.

The program in accordance with the embodiment of the present invention is a program that can be provided, for example, for a general-purpose system, which can execute various programs or codes, via a recording medium or a communication medium that provides the program in a computer readable form. Since the program is provided in the computer readable form, pieces of processing described in the program can be executed in a computer or a system.

The features and advantage of the present invention will be apparent from a description to be made in conjunction with the embodiment of the present invention and appended drawings. In this specification, what is referred to as a system is a logical conglomerate of multiple units but is not limited to a constitution having the component units incorporated in one housing.

According to the embodiments of the present invention, in a configuration that executes verification processing for a content recorded in a disk and reproduces the disk-recorded content under a condition that verification succeeds, hash units that are objects of collation are randomly selected from among multiple hash units formed with component data items of the content, and reading sequence determination processing is executed to determine a reading sequence in which the selected hash units are sorted according to the recording positions in a disk. Thereafter, the selected hash units are sequentially read from the disk according to the determined reading sequence in order to calculate hash values. The calculated hash values are collated with collation hash values. Owing to the configuration, a seek distance by which a head is moved during reading processing to be performed on the selected hash units is shortened. Further, the number of times by which layer switching processing is performed can be minimized. As a result, a time required for content verification is shortened, and a content reproduction beginning time instant is hastened.

BRIEF DESCRIPTION OF THE DRAWINGS

FIG. 1 shows diagrams for use in explaining an example of containment of hash units in a content recorded in a disk;

FIG. 13 is a diagram for use in explaining an example of the configuration of an information processing system that executes content reproduction with a disk mounted.

DESCRIPTION OF THE PREFERRED EMBODIMENTS

Referring to drawings, an information processing system, an information processing method, and a program in accordance with embodiments of the present invention will be described below. A description will be made by orderly following subjects presented below.

1. Disk-stored data
2. Structure of recorded data items of a content
3. Hash unit and content hash table (CHT)
4. Content verification processing accompanied by hash unit sorting to be achieved during sort processing
5. Example of the configuration of an information processing system

1. Disk-Stored Data

Figure 2:
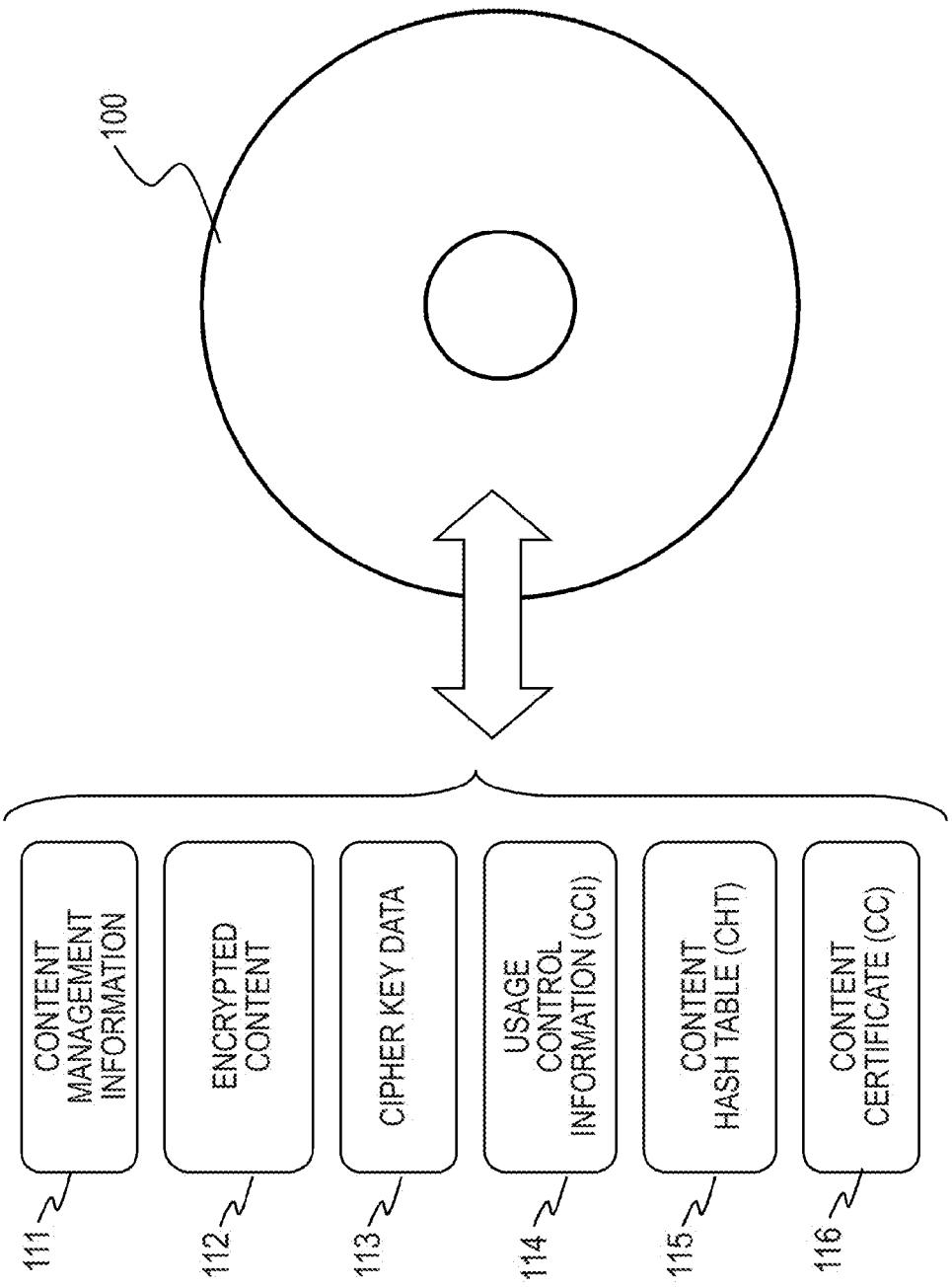
FIG. 2 is a diagram for use in explaining an example of data items stored in a disk (information recording medium)

To begin with, the structure of disk-stored data will be described below. FIG. 2 shows an example of a disk in which a content is stored. Herein, an example of a manner in which information is stored in a ROM disk that is a content-stored disk will be presented below.

A disk 100 shown in FIG. 2 is, for example, a digital versatile disc or a Blu-ray Disc (registered trademark). The disk 100 is a disk that is manufactured at a disk manufacturing plant under the permission of a so-called right holder of a content owning an authentic content copyright or distribution right and that contains an authentic content. The disk 100 may be either of a two-layer type that has been described with reference to FIG. 1 and a single-layer type.

FIG. 2 shows an example of data items recorded in the disk 100. In the disk 100, as shown in FIG. 2, such data items as content management information 111, an encrypted content 112, a cipher key 113, usage control information 114, a content hash table (CHT) 115, and a content certificate (CC) 116 are recorded. The data items will be sequentially described below.

Content Management Information 111

The content management information 111 is management information concerning various files that include files constituting a content and are recorded in the disk 100. The content management information 111 includes, for example, file system management information. The file system management information includes such pieces of file information as filenames of multiple files constituting an audiovisual (AV) data stream that represents a content, and file sizes thereof. Information for use in calculating data recording positions (addresses) from which data items of the content are read during content reproduction processing is included.

As a file system, for example, a Blu-ray Disc file system (BDFS) to be applied as a universal disc format (UDF) file system or a Blu-ray Disc (registered trademark) file format is adopted.

Encrypted Content 112

The encrypted content 112 is a content formed with, for example, an audiovisual data stream that represents a motion picture such as a high-definition (HD) movie and that is high-definition motion picture data, a game program formatted according to a specific standard, an image file, audio data, or text data. The content is a content encrypted in units of, for example, a CPS unit. The encrypted content 112 is represented by data standardized in a specific audiovisual format, and stored according to the specific audiovisual data format. More particularly, the encrypted content 112 is stored according to, for example, a Blu-ray Disc (registered trademark) ROM standard-based format.

Cipher Key 113

The cipher key 113 is a cipher key to be applied to decryption processing to be performed on the encrypted content 112, or data required for calculating the key. As mentioned previously, a content is segmented into units, encrypted by applying individual cipher keys (unit keys) to the units, and then stored in the disk 100. Namely, an audiovisual data stream representing a content, music data, image data representing a motion picture or a still image, a game program, or a Web content is segmented into units that are management units for using the content. When reproduction processing is performed in an information processing system, the different keys are used for the respective segmental units in order to perform decryption processing.

Usage Control Information (CCI) 114

The usage control information (CCI) 114 is copy restriction information or reproduction restriction information for use in controlling usage of the encrypted content 112 stored in the disk 100. The usage control information (CCI) 114 may be specified as information inherent to a CPS unit, specified in relation to multiple CPS units, or specified in any other various manners.

Content Hash Table (CHT) 115

The content hash table (CHT) 115 lists hash values based on component data items of a content stored in the disk 100, and is used to verify whether the content has been altered.

Hash values calculated from respective hash units (HUs) that are data units (having a length of, for example, 192K bytes) into which a clip file that is an audiovisual real data stream representing a content is divided are registered in the content hash table (CHT).

For example, several hundreds to several thousands of hash units are defined for one content. Hash values (values calculated from an authentic content) calculated from the hash units are registered as collation hash values (verification values) in the content hash table (CHT) 115.

An information processing system that reproduces a content randomly selects several hash units from among numerous defined hash units, reads data items (hash units) from the positions of the selected hash units, calculates hash values relative to the read hash units, and collates the hash values with the collation hash values (verification values) registered in the content hash table (CHT) 115.

If all of the selected hash units square with the verification values, the disk-recorded content is recognized as an authentic content that has not been altered. A process proceeds to content reproduction processing. If part of the selected hash units does not square with a counterpart of the verification values, the disk-recorded content is recognized as a content that may have been altered. The content reproduction processing is not permitted. The pieces of processing will be detailed later.

Content Certificate (CC) 116

The content certificate (CC) 116 is a certificate with which the authenticity of a content stored in an information recording medium is attested. Hash values of the multiple collation hash values (verification values) registered in the content hash table (CHT) described above are registered as hash digests. Further, an electronic signature is appended to the registered data items. For example, an electronic signature adopted by an entity that has issued the content certificate (for example, a content management center) is appended to the data items, and the data items are regarded as data items whose alteration has been prevented.

Figure 3:
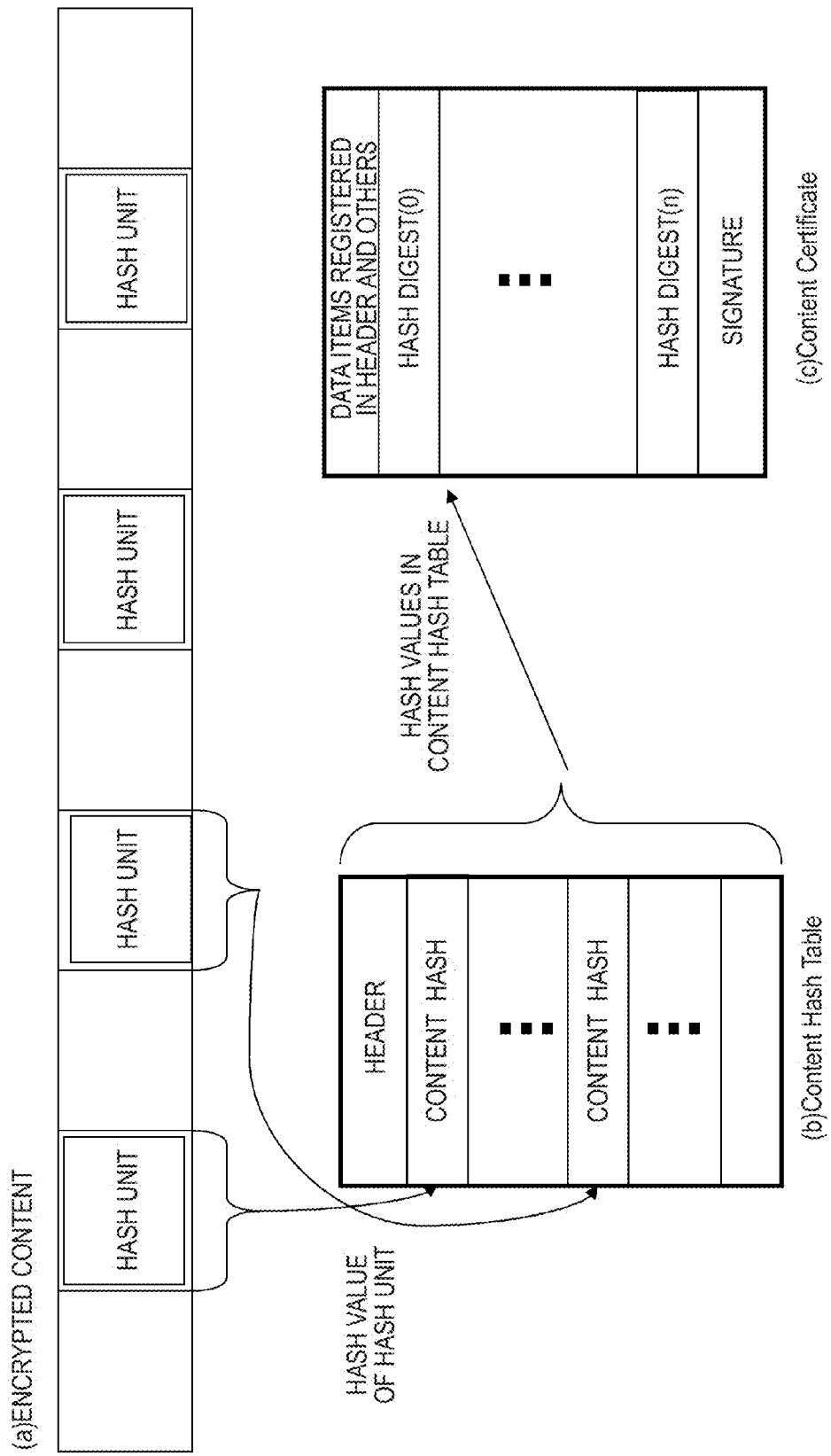
FIG. 3 is a diagram for use in explaining the relationship of association among hash units of a content stored in a disk, a content hash table, and a content certificate.

Referring to FIG. 3, a description will be made of the association among hash units defined in an encrypted content recorded in a disk, a content hash table, and data items registered in a content certificate. FIG. 3 shows (a) the encrypted content, (b) the content hash table (CHT), and (c) the content certificate (CC).

In the encrypted content (a), multiple hash units that are predetermined data units (having a length of, for example, 192K bytes) are defined as described previously. Hash values calculated from the respective hash units are registered as collation hash values in the content hash table (CHT) (b). Further, the hash values that are data items registered in the content hash table (CHT) (b) are registered in the content certificate (CC) (c).

Incidentally, the content hash table (CHT) (b) may be one table produced for each disk, one table produced in units of a content, or one table produced in units of a layer. Therefore, multiple content hash tables (CHTs) may be recorded in a disk. In this case, digests of the content has tables recorded in the disk are registered in the content certificate (c). An electronic signature adopted by an entity that has issued the content certificate (for example, a content management center) is specified in the content certificate.

The content hash table shown in part (b) of FIG. 3 is employed in alteration verification processing to be executed for a content prior to execution of, for example, content reproduction. Hash units defined in a content to be reproduced are selected and used to calculate hash values according to a predetermined hash-value calculation algorithm. Whether the calculated hash values square with the collation hash values (verification values) registered in the content hash table is decided in order to decide whether the content has been altered. The process will be described later.

2. Structure of Recorded Data Items of a Content

Figure 4:
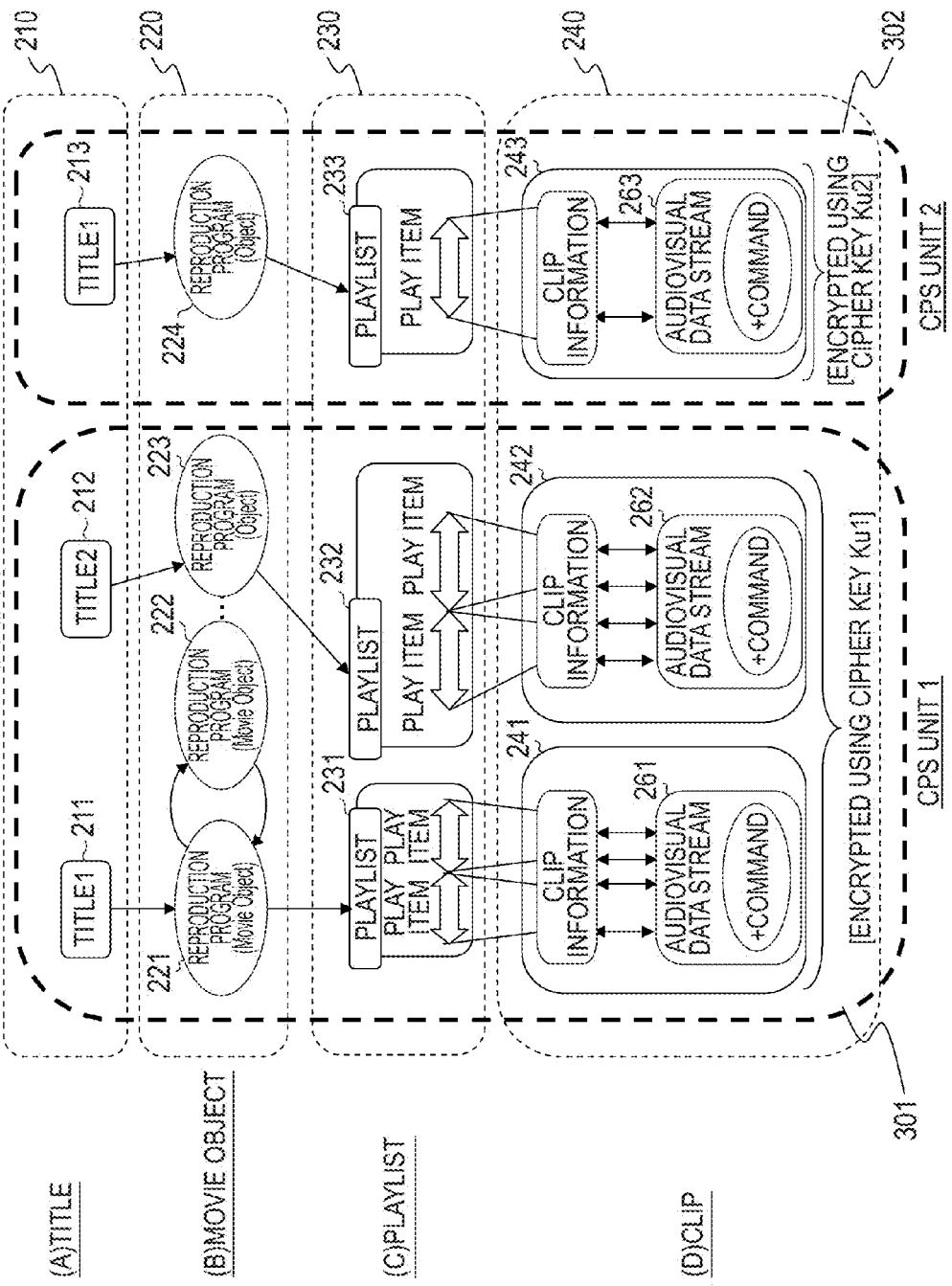
FIG. 4 is a diagram for use in explaining an example of a structure of data items recorded in relation to a content stored in a disk.

Referring to FIG. 4 and others, a structure of data items recorded as a content in a disk will be described below by taking an example. FIG. 4 shows the structure of data items recorded as a content in a Blu-ray Disc (registered trademark). As shown in FIG. 4, the content has a hierarchical structure composed of a (A) title 210, a (B) movie object 220, a (C) playlist 230, and a (D) clip 240. When a title with which an index file is accessed by a reproduction application is designated, a reproduction program associated with the title is designated. A playlist in which a reproduction order for the content is specified is selected based on information on the designated reproduction program. Based on clip information specified in the playlist, an audiovisual data stream that is real data of a content or a command is read in order to reproduce the audiovisual data stream or execute the command.

As mentioned above, different keys (unit keys) are assigned to the segments of a content stored in a disk in order to control different usages of the segments. The content is then encrypted and stored. A unit of a content or a segment thereof to which one unit key is assigned shall be referred to as a content management unit (CPS unit).

FIG. 4 shows two CPS units. The CPS units are portions of a content stored in an information recording medium. A CPS unit 1, 301 and a CPS unit 2, 302 are CPS units each including a title serving as an application index, a movie object serving as a reproduction program file, a playlist, and a clip including an audiovisual data stream that is real data of a content.

The content management unit (CPS unit) 1, 301 includes a title 1, 211 and a title 2, 212, reproduction programs 221 and 222, playlists 231 and 232, and clips 241 and 242. Audiovisual data stream files 261 and 262 that are real data items of contents and are included in the two clips 241 and 242 respectively are encrypted using a unit key Ku1 that is a cipher key associated with the content management unit (CPS unit) 1, 301.

The content management unit (CPS unit) 2, 302 includes a title 3, 213, a reproduction program 224, a playlist 233, and a clip 243. An audiovisual data stream file 263 that is real data of a content and included in the clip 243 is encrypted using a unit key Ku2 that is a cipher key associated with the content management unit (CPS unit) 2, 302.

For example, when a user wants to execute an application file or content reproduction processing associated with the content management unit 1, 301, the user has to acquire the unit key Ku1, which is the cipher key associated with the content management unit (CPS unit) 1, 301, and execute decryption processing. After the decryption processing is executed, the application program is run in order to reproduce a content. In order to execute an application file or content reproduction processing associated with the content management unit 2, 302, the unit key Ku1 that is the cipher key associated with the content management unit (CPS unit) 2, 302 has to be acquired in order to execute decryption processing.

Figure 5:
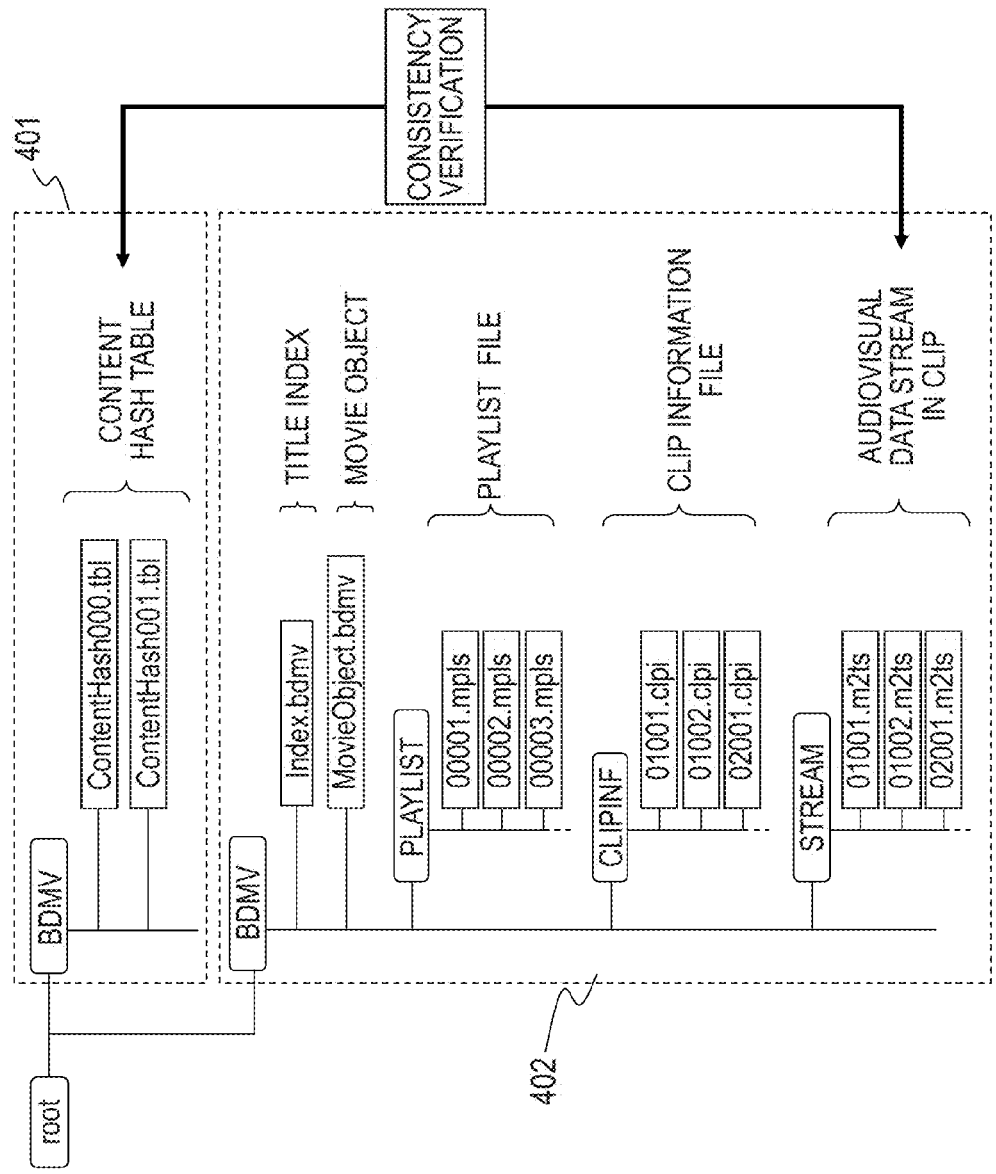
FIG. 5 is a diagram showing an example of the structure of directories according to which a content and pieces of management information including a cipher key are recorded in a disk.

FIG. 5 shows an example of a directory structure according to which contents and management information including a cipher key which are recorded in an information recording medium are organized. The directory structure shown in FIG. 5 is a BDMV directory structure conformable to a Blu-ray Disc ROM format. The BDMV directory structure is segmented into a content management data division 401 and a content data division 402. The content data division 402 has, as described with reference to FIG. 2, a hierarchical structure of a title, an object, a playlist, clip information, and an audiovisual data stream. Data files forming these directories are defined in the BDMV directory structure.

A management file concerning a content is contained in the content management data division 401. For example, the aforesaid content hash table is contained. Content management information including file system management information, a cipher key, usage control information, and a content certificate which have been described with reference to FIG. 2 are contained in the content management data division 401, though they are not shown in FIG. 5.

3. Hash Unit and Content Hash Table (CHT)

Next, referring to FIG. 6 and others, a hash unit and a content hash table (CHT) will be described below. The content hash table (CHT) is a table in which hash values calculated in relation to an authentic content recorded in a disk are registered as mentioned previously. A clip file that includes an audiovisual real data stream and is included in a CPS unit is divided into portions, and hash values are calculated based on hash units having a predetermined data length (for example, 192K bytes). The hash values are registered in the table as collation hash values for the respective hash units.

For example, several hundreds to several thousands of hash units are defined in one content, and collation hash values (verification values) for the hash units are registered in the content hash table (CHT) 115. In other words, hash values calculated in relation to an authentic content are registered. An information processing system that reproduces a content randomly selects several hash units from among numerous hash units, reads data items (hash units) from the positions in the content of the selected hash units, calculates hash values from the read hash units, and collates the hash values with the verification values registered in the content hash table (CHT) 115.

If all of the selected hash units square with the verification values, the disk-recorded content is recognized as an authentic content that has not been altered. The process then proceeds to content reproduction processing. If part of the selected hash units does not square with a counterpart of the verification values, the disk-recorded content is recognized as a content that may be altered. The content reproduction processing is not permitted.

Figure 6:
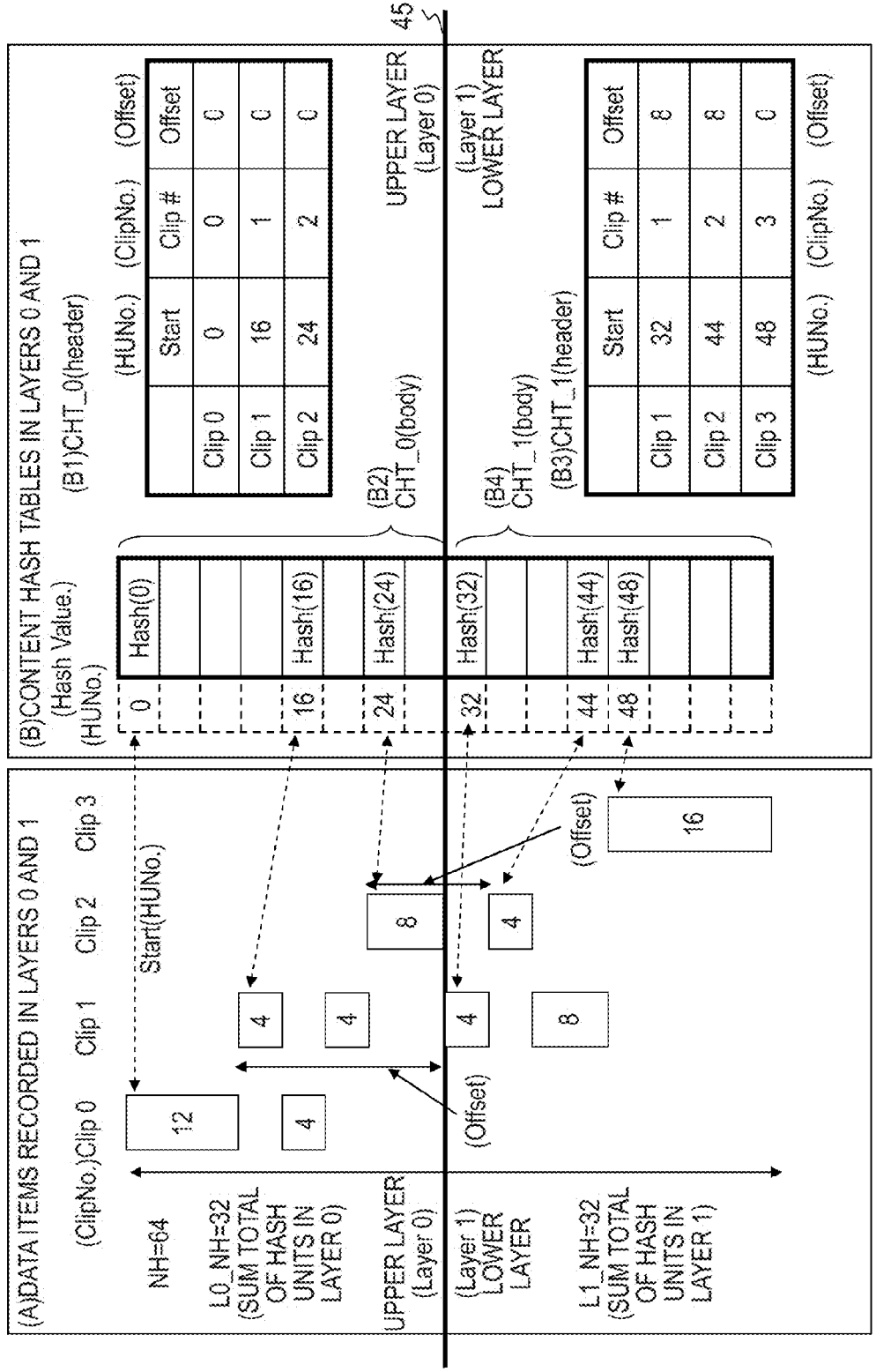
FIG. 6 is a diagram for use in explaining hash units and a content hash table (CHT)
Figure 7:
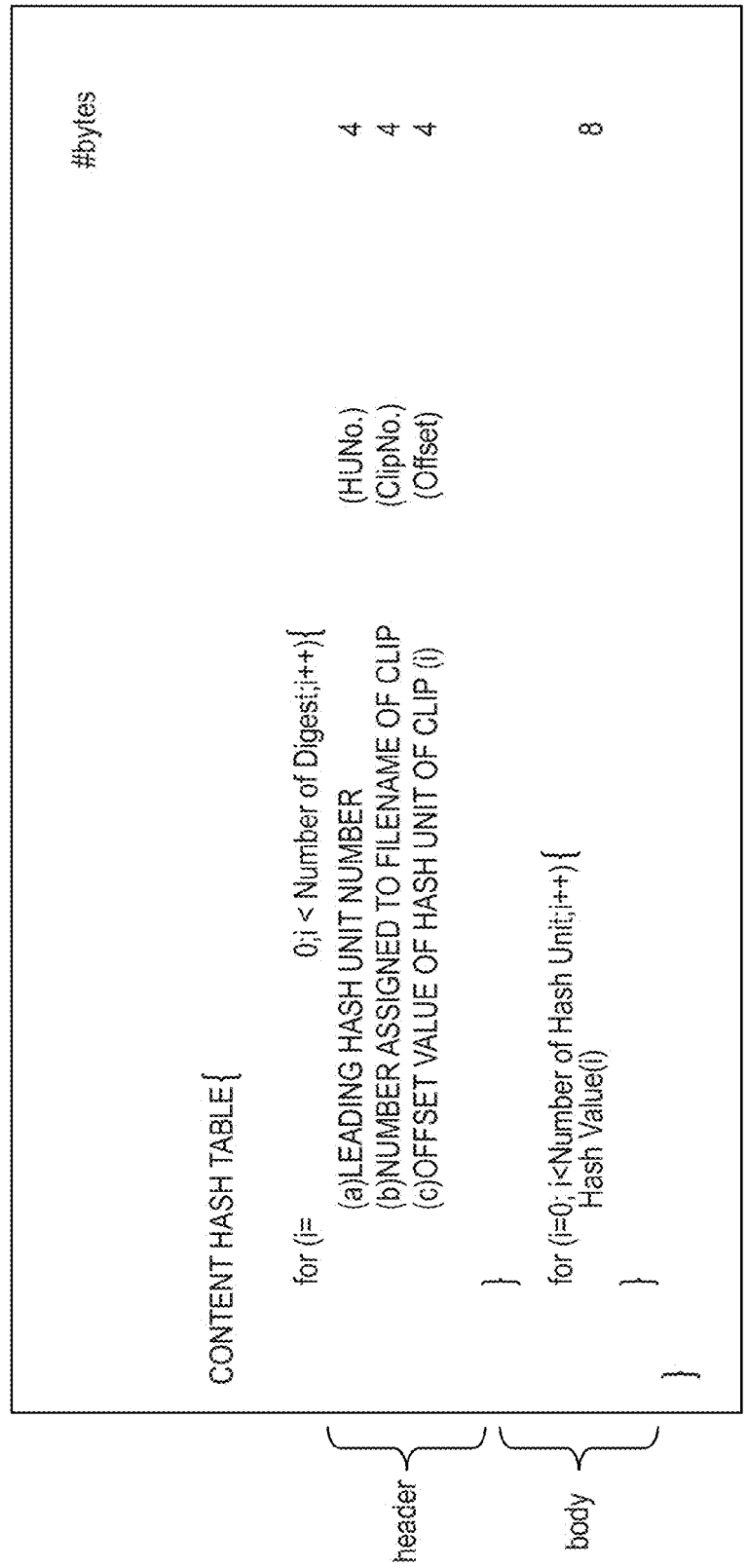
FIG. 7 is a diagram for use in explaining the structure (syntax) of data items actual registered in the content hash table.

Referring to FIG. 6 and FIG. 7, a concrete structure of the content hash table (CHT) will be described below. FIG. 6 is a diagram for use in explaining the relationship among clips and hash units, which are recorded in a two-layer disk, and pieces of information registered in the hash unit table (CHT).

FIG. 6 shows (A) data items recorded in a two-layer disk having an upper layer (layer 0), which is shown on an upper side of FIG. 6 with respect to a center line 451, and a lower layer (layer 1) that is shown on a lower side thereof, and the structure of (B) the content hash table (CHT). In an example to be described below, the content has table (CHT) shall be produced in relation to each layer. Specifically, a first content hash table relevant to the upper layer (layer 0) and a second content hash table relevant to the lower layer (layer 1) are recorded.

Incidentally, the content hash table (CHT) has a header and a body (collation hash values). The data structure (syntax) of the content hash table (CHT) will be described later in conjunction with FIG. 7.

In part (B) of FIG. 6, an example of data items to be registered in the content hash table (CHT) relevant to the upper layer (layer 0) is shown on the upper side thereof with respect to the center line 451. An example of data items to be registered in the content hash table (CHT) relevant to the lower layer (layer 1) is shown on the lower side thereof with respect to the center line 451.

Specifically, data items described below are shown in part (B) of FIG. 6.

(B1) Header of the first content hash table relevant to the upper layer (layer 0)

(B2) Body (collation hash values) of the first content hash table relevant to the upper layer (layer 0)

(B3) Header of the second content hash table relevant to the lower layer (layer 1)

(B4) Body (collation hash values) of the second content hash table relevant to the lower layer (layer 1).

Part (A) of FIG. 6 shows the arrangement of data items recorded in a disk having two layers (layers 0 and 1). Part (B) of FIG. 6 shows the structure of data items registered in the content hash tables in relation to the data items recorded in the disk.

The example shown in part (A) of FIG. 6 is an example in which four clips (clips 0 to 3) are recorded as component data items of a content in a disk having two layers (layers 0 and 1). Hash units are defined in each of the clips. Numerals 12, 4, and 8 shown in part (A) of FIG. 6 denote the numbers of hash units contained in the respective clips. The sum total (NH) of hash units stored in the disk is sixty-four because thirty-two hash units are stored in each of the upper layer (layer 0) and the lower layer (layer 1).

The clip 0 contains sixteen hash units all of which are recorded in the layer 0. In part (A) of FIG. 6, numerals 12 and 4 written in the column Clip 0 denote the numbers of hash units. The clip may have the hash units thereof recorded at physically separated positions. In the example shown in part (A) of FIG. 6, the clip 0 has the twelve hash units thereof located at a position separate from the position of the four hash units.

The clip 1 has eight hash units, which are divided in fours, recorded in the layer 0, and has twelve hash units, which are divided into four hash units and eight hash units, recorded in the layer 1.

The clip 2 has eight hash units recorded in the layer 0 and has four hash units recorded in the layer 1.

The clip 3 has sixteen hash units recorded in the layer 1.

The sum total (L0_NH) of hash units in the layer 0 is thirty-two, and the sum total (L1_NH) of hash units in the layer 1 is thirty-two.

In relation to the foregoing arrangement, the content hash table (CHT) is produced in relation to each layer. Two content hash tables are recorded. In the upper half of part (B) of FIG. 6, (B1) the header of the first content hash table relevant to the upper layer (layer 0) and (B2) the body (collation hash values) of the first content hash table relevant to the upper layer (layer 0) are shown as the component data items of the first content hash table relevant to the upper layer (layer 0).

In the lower half of part (B) of FIG. 6, (B3) the header of the second content hash table relevant to the lower layer (layer 1) and (B4) the body (collation hash values) of the second content hash table relevant to the lower layer (layer 1) are shown as the component data items of the second content hash table relevant to the lower layer (layer 1).

To begin with, the component data items of the first content hash table relevant to the upper layer (layer 0) will be described below.

In the header (B1) of the first content hash table relevant to the upper layer (layer 0), data items mentioned below are registered in relation to the clips 0, 1, and 2 having data items thereof recorded in the upper layer (layer 0).

In the column Start, leading hash unit numbers of clips (i) are specified.

In the column Clip #, clip numbers corresponding to the filenames of the clips (i) are specified.

In the column Offset, the offset values of the clips (i) are specified.

The leading hash unit number, clip number, and offset value will be described below.

The leading hash unit number of each clip (i) specified in the column Start is a number assigned to the leading hash unit of each of the clips 0, 1, and 2 recorded in the upper layer (layer 0).

The leading hash unit number of the clip 0 recorded in the upper layer (layer 0) is 0.

The leading hash unit number of the clip 1 recorded in the upper layer (layer 0) is 16.

The leading hash unit number of the clip 2 recorded in the upper layer (layer 0) is 24.

The values are specified in Start.

As the clip number corresponding to the filename of each clip (i) specified in the column Clip#, the clip number is recorded as it is. The clip number corresponds to the filename of each clip file or corresponds to a filename managed in file system management information.

The offset value of each clip (i) specified in the column Offset signifies how many hash units are present between the leading hash unit in a layer and the leading hash unit of a clip. If the leading hash unit in the layer is aligned with the leading hash unit of the clip, 0 is specified. If the leading hash unit in the layer is displaced by n hash units from the leading hash unit of the clip, n is specified. In the upper layer (layer 0), the leading hash units of the clips are aligned with the leading hash unit in the layer, 0 is specified in association with all the clips.

In the body (collation hash values) (B2) of the first content hash table relevant to the upper layer (layer 0), collation hash values (verification values) for the hash units recorded in the upper layer (layer 0) are registered.

The hash values for the hash units of numbers 0 to 31 are registered.

In part (B) of FIG. 6, (B1) the header of the first content hash table relevant to the upper layer (layer 0) and (B2) the body (collation hash values) of the first content hash table relevant to the upper layer (layer 0) are shown mutually separately. They are mutually separately shown for convenience' sake. In reality, the header and body are recorded as one file of data. Referring to FIG. 7, the structure (syntax) of data items actually recorded at the content hash table will be described later.

On the lower side of part (B) of FIG. 6, (B3) the header of the second content hash table relevant to the lower layer (layer 1) and (B4) the body (collation hash values) of the second content hash table relevant to the lower layer (layer 1) are shown.

The component data items of the second content hash table relevant to the lower layer (layer 1) will be described below.

In the header (B3) of the second content hash table relevant to the lower layer (layer 1), data items mentioned below are recorded in relation to the clips 1, 2, and 3 having data items thereof recorded in the lower layer (layer 1).

In the column Start, the leading hash unit numbers of the clips (i) are specified.

In the column Clip #, the clip numbers corresponding to the filenames of the clips (i) are specified.

In the column Offset, the offset values of the clips (i) are specified.

The leading hash unit number of each clip (i) specified in the column Start is a number assigned to the leading hash unit of each of the clips 1, 2, and 3 recorded in the lower layer (layer 1).

The leading hash unit number of the clip 1 recorded in the lower layer (layer 1) is 32.

The leading hash unit number of the clip 2 recorded in the lower layer (layer 1) is 44.

The leading hash unit number of the clip 3 recorded in the lower layer (layer 1) is 48.

The values are specified in Start.

As the clip number corresponding to the filename of each clip (i) specified in the column Clip #, the clip number is recorded as it is. The clip number corresponds to the filename of the clip file or corresponds to the filename managed in the file system management information.

The offset value of each clip (i) specified in the column Offset signifies how many hash units are present between the leading hash unit in a layer and the leading hash unit of the clip. If the leading hash unit in the layer is aligned with the leading hash unit of the clip, 0 is specified. If the leading hash unit in the layer is displaced by n hash units from the leading hash unit of the clip, n is specified.

Since the leading hash unit of the clip 1 is displaced by eight hash units from the leading hash unit in the layer, the offset of the clip 1 is 8.

Since the leading hash unit of the clip 2 is displaced by eight hash units from the leading hash unit in the layer, the offset of the clip 2 is 8.

Since the leading hash unit of the clip 3 is displaced by 0 hash unit from the leading hash unit in the layer, the offset of the clip 3 is 0.

The values are specified in Offset.

In part (B) of FIG. 6, (B3) the header of the second content hash table relevant to the lower layer (layer 1) and (B4) the body (collation hash values) of the second content hash table relevant to the lower layer (layer 1) are shown mutually separately. They are mutually separately shown for convenience's sake. In reality, the header and body are recorded as one file of data.

Referring to FIG. 7, the structure (syntax) of data items actually recorded as the content hash table will be described below. As shown in FIG. 7, pieces of information on hash units defined in each clip are registered in the content hash table (CHT). As shown in FIG. 7, the content hash table (CHT) includes a header and a body.

In the header, as described with reference to FIG. 6, the leading hash unit number of each clip (i) is specified in HUNo., the clip number corresponding to the filename of the clip (i) is specified in ClipNo., and the offset value of the clip (i) is specified in Offset.

The numerical values are specified as four-byte data items respectively.

In the body, the collation hash values for the hash units are registered.

Hash values to be registered as the collation hash values in the body are registered at, for example, a disk plant at which recording an authentic content is carried out.

As described previously, in an information processing system (reproducing system), when content verification including hash value calculation processing and collation processing is executed, hash unit numbers are randomly selected. Several (for example, seven) hash units that are objects of verification are selected from among all hash units in order to perform verification. Owing to the selection processing, verification processing can be achieved for a short period of time. In the embodiment of the present invention, sort processing is executed in order to sort the selected hash units orderly according to physical recording positions in a disk. After the sort processing is completed, data items constituting the hash units are read from the disk. Owing to the sort processing, the processing of reading data items from the disk can be efficiently achieved in order to shorten a content verification processing time. The processing will be described in the next section.

4. Content Verification Processing Accompanied by Sorting of Hash Units Through Sort Processing Next, content verification processing accompanied by sorting of hash units through sort processing will be described below. As previously described, in the configuration of the embodiment of the present invention, an information processing system (reproducing system) that executes reproduction of a content from a disk randomly selects several (for example, seven) hash units, which are objects of verification, from among all hash units, and executes sort processing so as to sort the selected hash units orderly according to physical recording positions in the disk.

After the sort processing is completed, data items constituting the hash units are read from the disk in order to calculate hash values. The hash values are collated with collation hash values registered in the content hash table in order to verify a content. Thus, the information processing system in accordance with the embodiment of the present invention is configured to shorten a content verification processing time by efficiently performing processing of reading data items from the disk through the sort processing.

Figure 8:
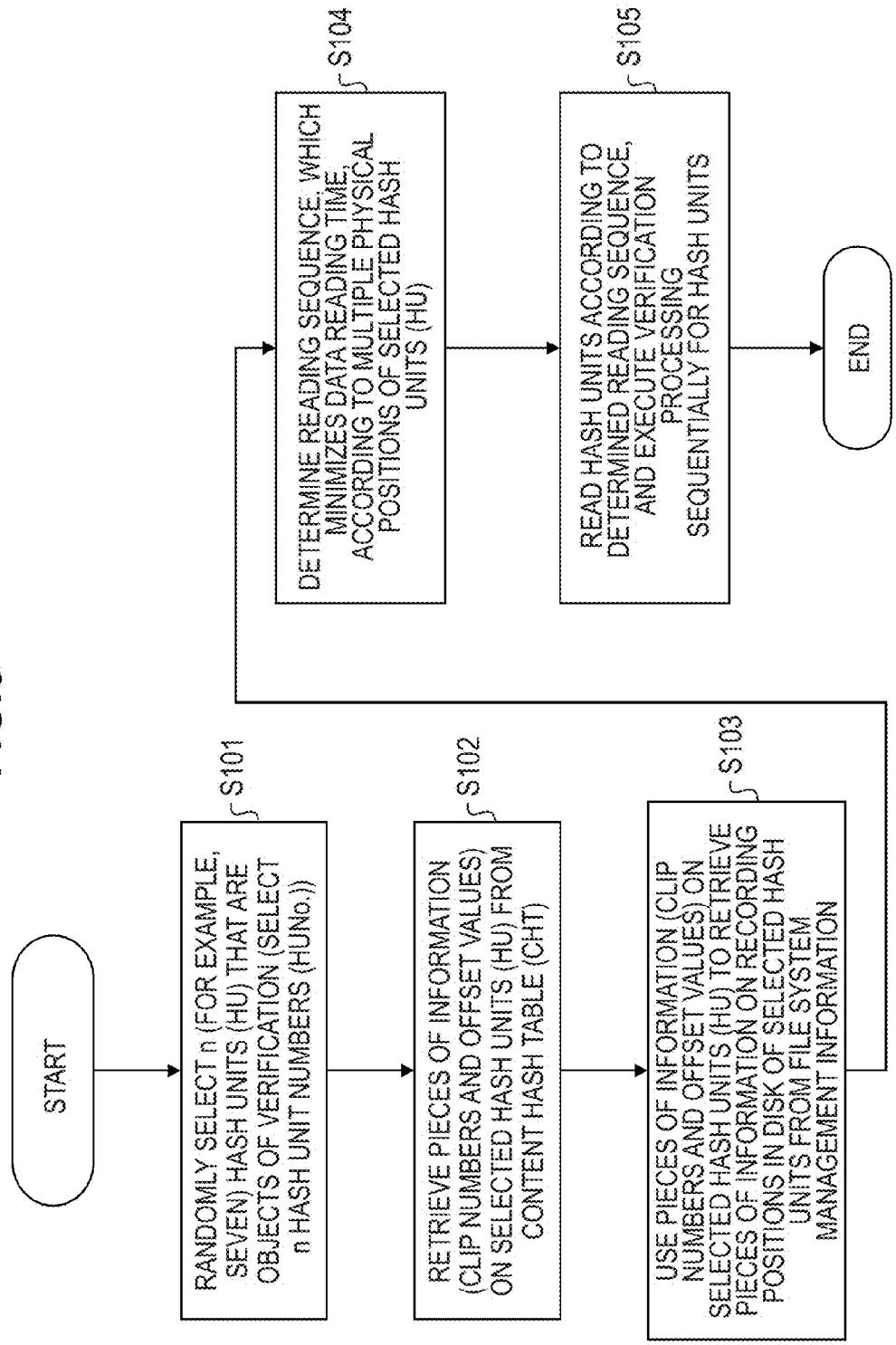
FIG. 8 is a diagram showing a flowchart that describes a process of content verification processing to be executed in an information processing system.

FIG. 8 is a flowchart describing a process of content verification processing to be executed in the information processing system in accordance with the embodiment of the present invention. The process described in FIG. 8 is executed by the data processing unit included in the information processing system that reproduces a content recorded in a disk. Processing steps in the flowchart of FIG. 8 will be described below.

To begin with, at step S101, n (for example, seven) hash units (HUs) that are objects of verification are randomly selected. More particularly, n hash unit numbers (HUNo.) are selected. The selection processing is achieved by executing the processing of producing n random numbers, for example, within a range from the minimum value of hash unit numbers to the maximum value thereof, and selecting hash unit numbers corresponding to the n produced random numbers.

At step S102, pieces of information (clip numbers and offset values) on the selected hash units (HUs) are retrieved from the content hash table (CHT). The clip numbers and offset values associated with the selected hash units (HUs) are retrieved from the header of the content hash table (CHT) described with reference to FIG. 6 and FIG. 7.

At step S103, the pieces of information on the selected hash units (HUs) (clip numbers and offset values) are used to retrieve recording positions in a disk of the selected hash units (HUs) from file system management information.

At step S104, a reading sequence that minimizes a data reading time is determined based on the recording positions in the disk of the selected hash units.

Finally, at step S105, the hash units are read according to the determined reading sequence, and verification processing is then executed sequentially for the hash units.

As mentioned above, the information processing system in accordance with the embodiment of the present invention randomly selects several (for example, seven) hash units, which are objects of verification, from among all hash units, and executes sort processing so as to sort the selected hash units orderly according to physical recording positions in a disk. After the sort processing is completed, data items constituting the hash units are read from the disk in order to calculate hash values. The hash values are then collated with collation hash values registered in the content hash table in order to verify a content. Owing to the process, a content verification processing time is shortened by efficiently performing the processing of reading data items from the disk.

At step S103, the pieces of information (clip numbers and offset values) on the selected hash units (HUs) are used to retrieve pieces of information on the recording positions in a disk of the selected hash units (HUs) from file system management information. The processing will be detailed below.

The file system management information is, as described previously with reference to FIG. 2, included in the content management information 111 recorded in the disk 100. In the file system management information, pieces of file information such as filenames of multiple files constituting an audiovisual data stream that represent a content, and file sizes are contained. For example, pieces of information for use in calculating recording positions of data items when the content is read for content reproduction processing are contained.

The information processing system retrieves pieces of information on selected hash units (HUs) from the content hash table. Specifically, the information processing system retrieves clip numbers and offset values, which are concerned with the selected hash units (HUs), from the content hash table. The pieces of information are used to retrieve the recording positions in a disk of the selected hash units (HUs) from the file system management information. The process varies depending on a file system employed.

An example of pieces of processing to be performed in a case where a universal disc format (UDF) is adopted as a file system will be described below. In the UDF file system, a partition descriptor and an allocation descriptor are adopted as pieces of information on the recording position in a disk of each file (a clip file or the like).

Based on the clip numbers and offset values that are associated with the selected hash units and retrieved from the content hash table (CHT), partition descriptors and allocation descriptors associated with the hash units, for example, seven hash units are obtained.

The descriptor is basically associated with a logical sector number (LSN). By sorting hash units according to the values of the descriptors, the randomly selected hash units can be sorted in order by logical sector number (LSN).

In order to check the physical positions of hash units in clip files, two pieces of information are required. Namely, (1) the leading address of a partition (the leading address of a partition in a disk) and (2) a relative position of a file from the leading address of a partition to which the file belongs are required.

Out of the two pieces of information, the information (1) can be obtained using UDF management information (file system management information according to a sequence described below.

A partition map is obtained based on a Logical Volume Descriptor→Partition Map→Partition Descriptor→Partition Starting Location The information (2) can be obtained using UDF management information (file system management information) according to a sequence described below.

A file set descriptor is obtained based on a logical volume descriptor, an ICB (root) is obtained based on the file set descriptor, a file identifier descriptor is retrieved from the ICB, a file entry is obtained based on the file identifier descriptor, and an allocation descriptor is retrieved from the file entry.

The sum of the leading address (LSN) of a partition and the relative address of a file from the leading address of a partition to which the file belongs equals the logical sector number (LSN) of the file in a disk.

For example, when the UDF file system is employed, logical sector numbers (LSNs) corresponding to recording positions in a disk of hash units can be obtained based on pieces of information registered in a content hash table and pieces of information recorded as file system management information according to the foregoing procedure.

At step S104, sort processing is performed in order to sort the logical sector numbers (LSNs) of several (for example, seven) selected hash units obtained in the above manner in ascending or descending order. The results of the sort processing are determined as a hash-unit reading sequence.

In the present example, a ROM disk in which a content is stored in advance is employed. Logical sector numbers are sorted according to physical recording positions in a disk. Therefore, data items (hash units of the content) can be sorted according to the physical recording positions in the disk by performing sort processing on the basis of the values of the logical sector numbers (LSNs).

At step S104, a reading sequence is determined by performing sort processing so as to sort the logical sector numbers (LSN) of the selected hash units, which are obtained at step S103, in ascending or descending order. In other words, a reading sequence that minimizes a data reading time is determined according to the recording positions in a disk of the selected hash units (HUs). A concrete example will be described later with reference to FIG. 9 to FIG. 11.

Figure 9:
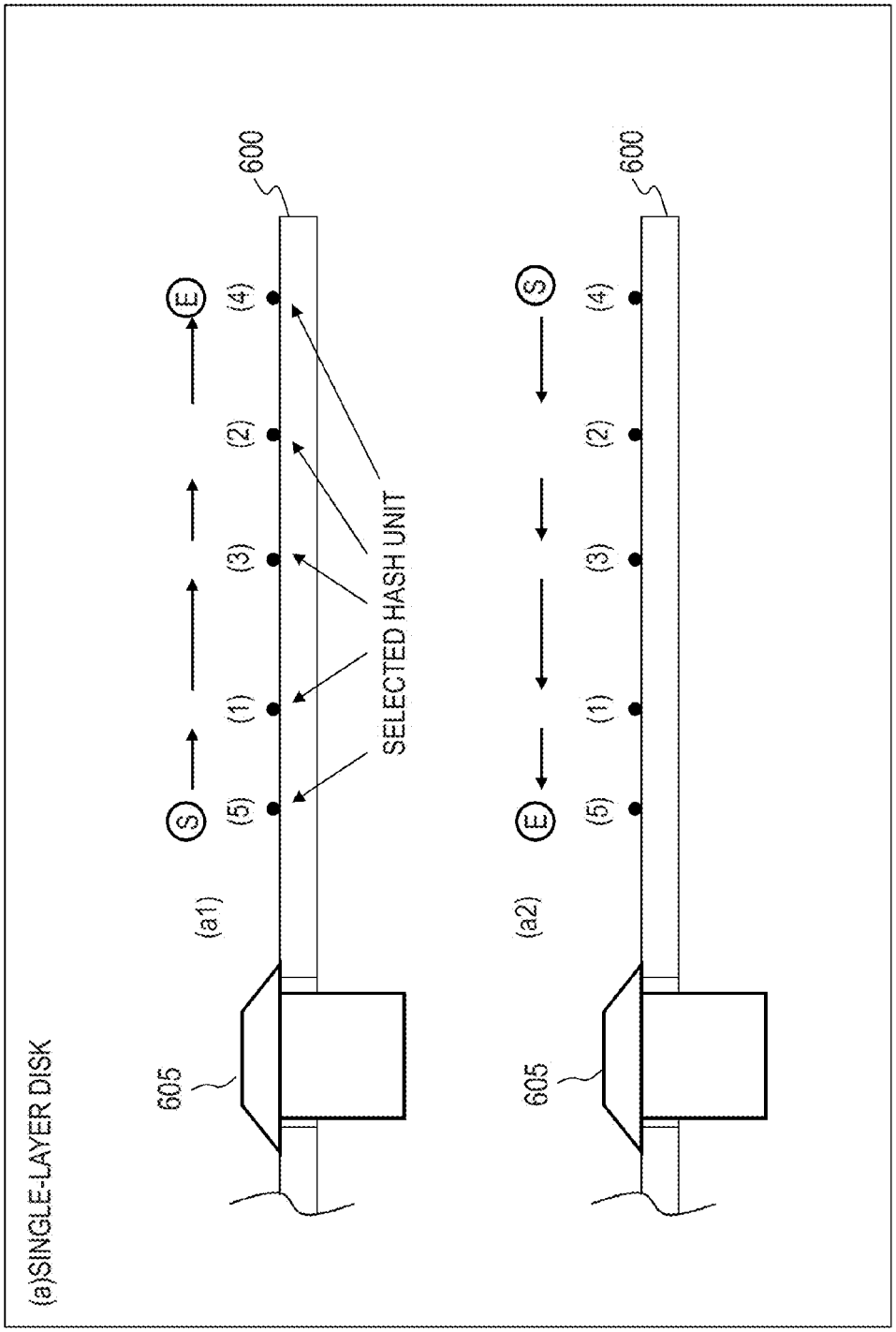
FIG. 9 is a diagram for use in explaining an example of a data reading sequence to be determined according to recording positions in a disk of selected hash units (HUs)
Figure 10:
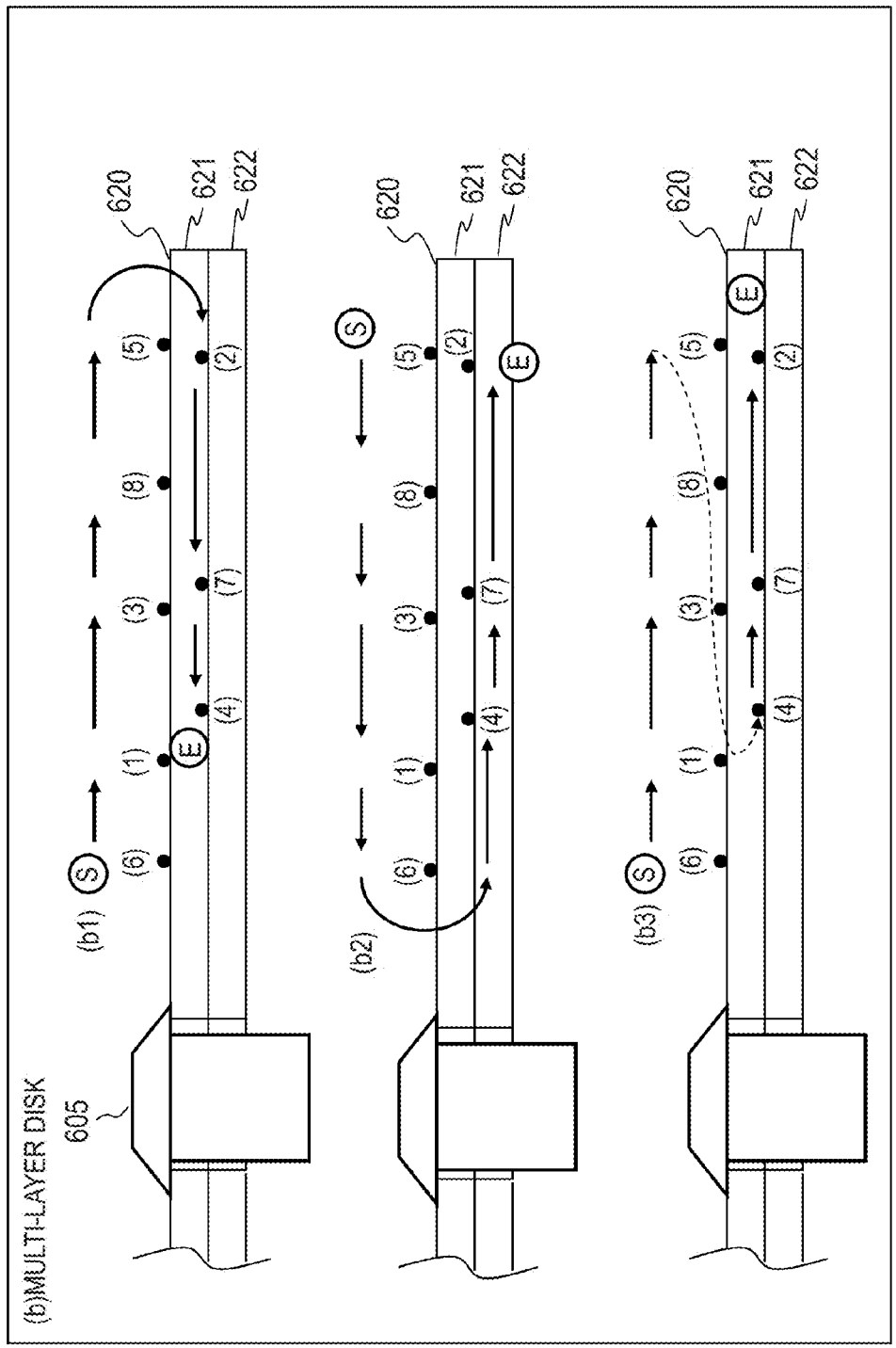
FIG. 10 is a diagram for use in explaining an example of the data reading sequence to be determined according to the recording positions in the disk of the selected hash units (HUs)

FIG. 9 is a diagram for use in explaining an example of determining a reading sequence for hash units in a case where a disk is a single-layer disk, that is, a disk having only one layer. FIG. 10 is a diagram for use in explaining an example thereof in a case where a disk is a multi-layer disk, that is, a disk having two layers.

Referring to FIG. 9, the case where a disk is a single-layer disk, that is, a disk having only one layer will be described below. FIG. 9 shows a disk 600 mounted on a spindle 605.

Assume that the recording positions in a disk of hash units selected through random selection processing are positions (1) to (5) in FIG. 9. According to a sequence employed in a related art, hash units are read in the order in which the hash units are randomly selected. Therefore, data items are read from the positions (1), (2), (3), (4), and (5) in that order.

When data items are read in the above order, a reading-head moving distance is long. In addition, moving direction changing processing has to be repeatedly executed. As a result, a data reading time gets longer.

In contrast, according to the embodiment of the present invention, a reading sequence that minimizes a data reading time is determined at step S104 according to pieces of information on recording positions of hash units selected at step S103 in FIG. 8. More particularly, a sequence shown as (a1) in FIG. 9 or a sequence shown as (a2) therein is adopted as a data reading sequence.

The hash unit reading sequence shown as (a1) in FIG. 9 is a sequence of reading hash units from the positions (5), (1), (3), (2), and (4) in that order.

The sequence is a sequence of reading selected hash units orderly from the internal side of a disk toward the external side thereof. Reference numeral S in the drawing denotes a start position, and E denotes an end position.

The hash-unit reading sequence shown as (a2) in FIG. 9 is a sequence of reading hash units from the positions (4), (2), (3), (1), and (5) in that order.

The sequence is a sequence of reading selected hash units orderly from the external side of a disk toward the internal side thereof.

When such a sequence is determined, a moving distance by which a reading head is moved during data reading is decreased. A total data reading time required for all selected hash units can be reduced. As a result, a time required for content verification is shortened, and beginning of content reproduction is hastened.

Next, referring to FIG. 10, an example of determining a hash-unit reading sequence in a case where a disk is a multi-layer disk, that is, a disk having two layers will be described below. FIG. 10 shows a disk 620 mounted on the spindle 605. The disk is a two-layer disk having an upper layer (layer 0) 621 and a lower layer (layer 1) 622.

Assume that the recording positions in a disk of hash units selected through random selection processing are positions (1) to (8) shown in FIG. 9. According to a sequence employed in the related art, the hash units are read in the order in which the hash units are randomly selected. Therefore, data items are read from the positions (1), (2), (3), (4), (5), (6), (7), and (8) in that order.

When data items are read according to the above order, not only a reading-head moving distance increases but also processing of alternately executing data reading from the upper layer (layer 0) 621 and data reading from the lower layer (layer 1) 622 is required. Focusing on each of the layers has to be performed multiple times. As a result, a data reading time is extended.

In the system according to the embodiment of the present invention, a reading sequence that minimizes a data reading time is determined at step S104 according to pieces of information on the recording positions of hash units that are selected at step S103 in FIG. 8. More particularly, for example, a sequence shown as (b1), (b2), or (b3) in FIG. 10 is determined as the data reading sequence.

The hash-unit reading sequence shown as (b1) in FIG. 10 is a sequence of reading hash units from the positions (6), (1), (3), (8), (5), (2), (7), and (4) in that order.

Namely, the selected hash units are read orderly from the internal side of the upper layer (layer 0) 621 of the disk 620 toward the external side thereof, and then read orderly from the external side of the lower layer (layer 1) 622 thereof toward the internal side thereof.

The hash-unit reading sequence shown as (b2) in FIG. 10 is a sequence of reading hash units from the positions (5), (8), (3), (1), (6), (4), (7), and (2) in that order.

Namely, the selected hash units are read orderly from the external side of the upper layer (layer 0) 621 of the disk 620 toward the internal side thereof, and then read orderly from the internal side of the lower layer (layer 1) 622 thereof toward the external side thereof.

The hash-unit reading sequence shown as (b3) in FIG. 10 is a sequence of reading hash units from the positions (6), (1), (3), (8), (5), (4), (7), and (2) in that order.

Namely, the selected hash units are read orderly from the internal side of the upper layer (layer 0) 621 of the disk 620 toward the external side thereof, and then read orderly from the internal side of the lower layer (layer 1) 622 thereof toward the external side thereof.

When the sequence is determined as mentioned above, a moving distance by a reading head is moved during data reading is decreased. Further, the number of times by which the upper layer (layer 0) 621 and lower layer (layer 1) 622 are switched is only one. The number of times by which focusing accompanying layer switching is performed is only one. As a result, a data reading time can be reduced. In other words, a time required fro content verification is reduced, and beginning of content reproduction is hastened.

Figure 11:
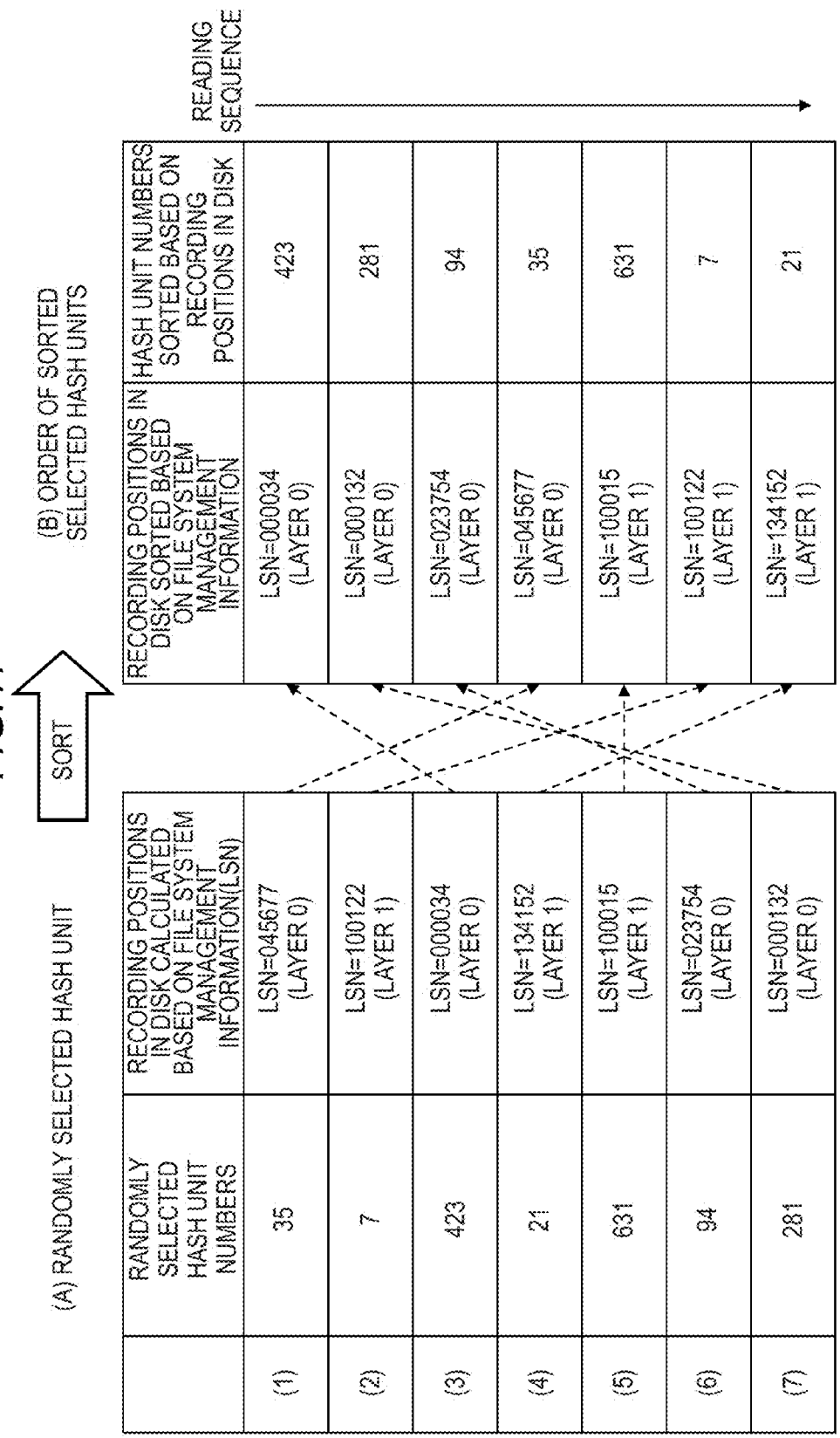
FIG. 11 is a diagram for use in explaining an example of sort processing during which a data reading sequence is determined according to the recording positions in the disk of the selected hash units (HUs)

Referring to FIG. 11, a description will be made of an example of sort processing to be executed for hash units by the information processing system in a case where the hash-unit reading sequence shown as (b1) in FIG. 10 is adopted.

Part (A) of FIG. 11 shows hash unit numbers of seven hash units randomly selected by the information processing system, and logical sector numbers associated with the reading positions in a disk of the selected hash units. The information processing system retrieves pieces of information, which are associated with the seven randomly selected hash units, from a content hash table, and obtains the logical sector numbers of the hash units from file system information using the retrieved pieces of information.

The recording positions in a disk of the hash units (1) to (7) shown in part (A) of FIG. 11 are dispersed to and fro, and are therefore sorted by logical sector number value. The results of the sort are shown in part (B) of FIG. 11. Due to the sort processing, a reading sequence is determined so that hash units will be read from the internal side of the layer 0 toward the external side thereof, and then from the external side of the layer 1 toward the internal side thereof. According to a manner in which the logical sector numbers (LSNs) are determined, any of the reading sequences (b1), (b2), and (b3) shown in FIG. 10 is adopted.

As mentioned above, since the results of sort shown in part (B) of FIG. 11 are adopted orderly from above as a reading sequence, a seek distance by which a head is moved during hash-unit reading is decreased. In addition, focus control accompanying layer switching may be performed only once. A data reading time can be reduced. Eventually, a time required for content verification is reduced, and beginning of content reproduction is hastened.

Figure 12:
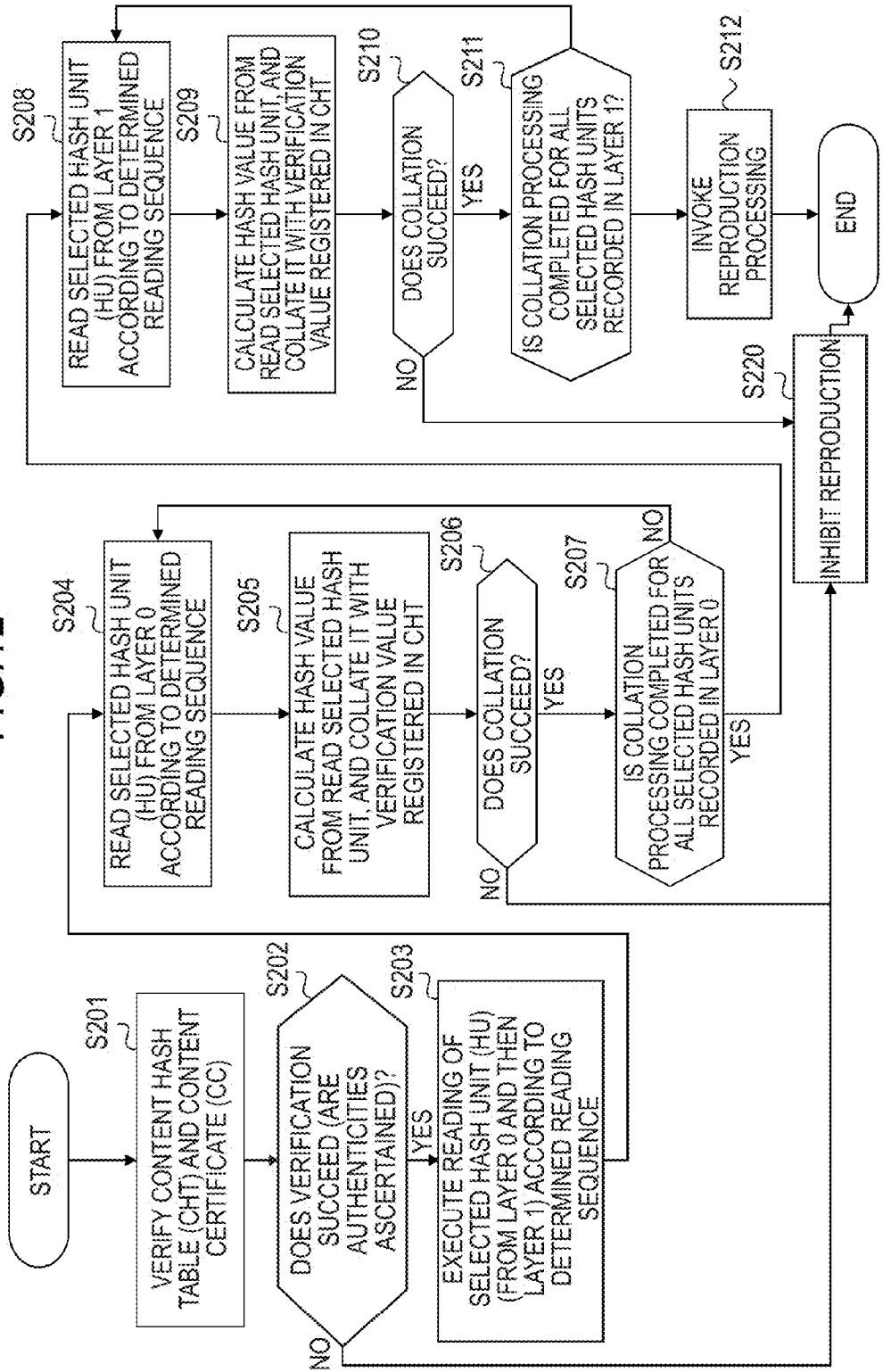
FIG. 12 is a diagram showing a flowchart that describes a procedure of performing a data reading and collation processing according to the recording positions in the disk of the selected hash units (HUs)

Next, referring to the flowchart of FIG. 12, an example of a detailed process for content verification processing mentioned as step S105 in the flowchart of FIG. 8 will be described below. The process described in the flowchart of FIG. 12 is executed by the data processing unit included in the information processing system that reproduces a content recorded in a mounted disk. Incidentally, the process described in FIG. 12 is an example of pieces of processing to be performed in a case where the mounted disk is a two-layer disk.

At step S201, the information processing system that attempts to reproduce a content recorded in a disk acquires a content hash table (CHT) and a content certificate (CC), which are recorded in the disk, and verifies these data items. Specifically, a signature specified in the content certificate (CC) is verified, and digest (hash) values of hash values specified in the content hash table are calculated and collated with digests specified in the content certificate (CC). For verification of the signature in the content certificate (CC), a public key to be acquired from a signature verification public key certificate stored in a memory included in the system is employed.

At step S202, the results of verifications performed on the content hash table (CHT) and content certificate (CC) are checked. If the authenticities of the content hash table (CHT) and content certificate (CC) are not ascertained, the process proceeds to step S220. Reproduction of a content from a disk is inhibited and the process is terminated.

If it is ascertained that the content hash table (CHT) and content certificate (CC) are authentic data items but have not been altered, the process proceeds to step S203. At step S203, reading of hash units is executed according to the hash-unit reading sequence determined at step S104 in the aforesaid flowchart of FIG. 8.

The hash-unit reading sequence is, as described with reference to FIG. 8 to FIG. 11, a sequence in which hash units randomly selected as objects of collation processing are sorted in order by physical recording position in a disk. More particularly, the hash-unit reading sequence is, for example, a sequence in which logical sector numbers (LSNs) relevant to the randomly selected hash units are sorted in ascending or descending order.

In the case of the two-layer disk, the reading sequence is, as described with reference to FIG. 10 and FIG. 11, determined so that the number of times by which the layer 0 and layer 1 of the disk are switched will be only one. According to the reading sequence, the selected hash units are read sequentially from the layer 0 and then the layer 1.

At step S204, one of the selected hash units in the layer 0 is read according to the reading sequence. At step S205, a hash value is calculated from the read hash unit, and compared with a collation hash value (verification value) registered in the content hash table (CHT). If the squareness with the collation hash value is ascertained at step S206, the process proceeds to step S207. If the squareness with the collation hash value is not ascertained at step S206, the process proceeds to step S220. Reproduction of a content from the disk is inhibited and the process is terminated.

At step S207, whether collation processing is completed for all the selected hash units recorded in the layer 0 is ascertained. If collation processing is not completed for all the selected hash units recorded in the layer 0, the process returns to step S204. The next hash unit recorded in the layer 0 is read according to the reading sequence, and step S205 and subsequent steps are repeated.

If a decision is made at step S207 that collation processing is completed for all the selected hash units recorded in the layer 0, the process proceeds to step S208.

At step S208, one of the selected hash units in the layer 1 is read according to the reading sequence. At step S209, a hash value is calculated from the read hash unit, and compared with a collation hash value (verification value) registered in the content hash table (CHT). If the squareness of the hash value with the collation hash value is ascertained at step S210, the process proceeds to step S211. If the squareness is not ascertained at step S210, the process proceeds to step S220. Reproduction of a content from the disk is inhibited and the process is terminated.

At step S211, whether collation processing is completed for all the selected hash units recorded in the layer 1 is ascertained. If collation processing is not completed for all the selected hash units recorded in the layer 1, the process returns to step S208. The next hash unit recorded in the layer 1 is read according to the reading sequence, and step S209 and subsequent steps are repeated.

If a decision is made at step S211 that collation processing is completed for all the selected hash units recorded in the layer 1, the process proceeds to step S212. At step S212, content reproduction processing is invoked.

As mentioned above, in this example of pieces of processing, the recording positions in a disk of hash units randomly selected as objects of collation are checked. After the hash units are sorted according to the recording positions, each of the hash units is read and subjected to collation processing. Owing to the process, a seek distance by which a head is moved is shortened. Further, the number of times by which layer switching processing is performed is minimized. As a result, a time required for content verification is shortened, and a content reproduction beginning time instant is hastened.

5. Example of the Configuration of an Information Processing System

Referring to FIG. 13, an example of the configuration of an information processing system that performs reproduction processing on a disk-recorded content will be described below. An information processing system 800 includes a drive 890 that drives a disk (information recording medium) 891 and inputs or outputs a data recording/reproducing signal, a CPU 870 serving as a data processing unit that executes data processing according to various programs, a ROM 860 serving as a storage area for programs or parameters, a memory 880, an input/output interface 810 via which a digital signal is inputted or outputted, an input/output interface 840 via which an analog signal is inputted or outputted and which includes an A/D and D/A converter 841, a codec 830 that executes encoding or decoding processing for, for example, MPEG data, and an encryption processor 850 that executes various pieces of encryption processing. These units are interconnected over a bus 801.

Encryption processing, decryption processing, hash-value calculation, and signature verification processing in the information processing system 800 are executed by the encryption processor 850 or CPU 870 according to, for example, an AES algorithm or through any arithmetic processing. A program to be run to execute content reproduction or recording processing is preserved in, for example, the ROM 860. While the program is being run, the memory 880 is used, if necessary, as a parameter or data preservation area or a work area.

In the ROM 860 or memory 880, a cipher key to be applied to content decryption, a secret key compatible with an information processing system, and a public key certificate are stored.

For reproduction of a content or output thereof to outside, content alteration verification processing is executed based on hash values registered in a content hash table. Further, decryption processing for an encrypted content and other pieces of processing are executed according to the aforesaid processes for the examples of pieces of processing.

The present invention has been described with reference to the specific embodiment. However, it is apparent that a person with ordinary skill in the art can modify the embodiment or devise a substitute without a departure from the gist of the invention. The present invention has been disclosed by presenting examples but should not be interpreted in a limited manner. For an understanding of the gist of the present invention, Claims should be referenced.

The series of pieces of processing described in this specification may be executed by hardware, software, or a combination of hardware and software. In order to execute the pieces of processing by software, a program in which the process is described may be installed in a memory in a computer incorporated in dedicated hardware and then run. Otherwise, the program may be installed in a general-purpose computer capable of executing various kinds of pieces of processing and then run. For example, the program may be stored in advance in a recording medium. The program may be loaded from the recording medium to the computer, or may be received over a network such as a local area network (LAN) or the Internet, and then installed in the recording medium such as a built-in hard disk.

Various kinds of pieces of processing described in this specification may not only be time-sequentially executed as described therein but also be executed in parallel with one another or independently of one another according to the throughput of a system, which executes the pieces of processing, or whenever the execution is needed. What is referred to as a system in this specification is a logical conglomerate of multiple units but is not limited to a constitution having all the component units incorporated in the same housing.

As described so far, according to the embodiment of the present invention, verification processing is executed for a content recorded in a disk, and the disk-recorded content is reproduced under a condition that the verification succeeds. In this configuration, hash units that are objects of collation are randomly selected from among multiple hash units formed with component data items of the content. Reading sequence determination processing is then executed in order to determine a reading sequence in which the selected hash units are sorted according to recording positions thereof in the disk. Thereafter, the selected hash units are sequentially read from the disk according to the determined reading sequence in order to calculate hash values. The calculated hash values are collated with collation hash values. Owing to the constitution, a seek distance by which a head is moved during reading processing for the selected hash units is shortened. Further, the number of times by which layer switching processing is performed can be minimized. As a result, a time required for content verification is shortened, and a content reproduction beginning time instant is hastened.

The present application contains subject matter related to that disclosed in Japanese Priority Patent Application JP 2008-237426 filed in the Japan Patent Office on Sep. 17, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising:
a data processing unit configured:
to execute verification processing for a content recorded in a disk, the content comprising a plurality of hash units,
to reproduce the content under a condition that the verification succeeds,
to select hash units, from among the plurality of hash units,
to read the selected hash units from the disk according to a reading sequence,
to calculate hash values,
to collate the calculated hash values with collation hash values, and
to determine the reading sequence of the selected hash units according to recording positions in a disk, the determined reading sequence corresponding to a minimum number of inter-layer movements when the selected hash units are arranged in a plurality of layers of the disk.

2. The information processing system according to claim 1, wherein the data processing unit is further configured to determine the reading sequence in a way that permits reading of the selected hash units through a movement in either a first direction from an internal circumference of the disk to an external circumference thereof or a second direction from the external circumference of the disk to the internal circumference thereof if the selected hash units are arranged in a layer of the disk.

3. The information processing system according to claim 1, wherein the data processing unit is configured to retrieve pieces of information on recording positions in the disk of the selected hash units from file system management information, and to determine the reading sequence by performing sort processing in which the pieces of information are employed.

4. The information processing system according to claim 3, wherein the data processing unit is configured to retrieve pieces of hash-unit information, which are concerned with the selected hash units, from a content hash table recorded in the disk, and to retrieve the pieces of information on the recording positions of the selected hash units using the pieces of hash-unit information.

5. The information processing system according to claim 3, wherein the data processing unit is configured to retrieve logical sector numbers (LSNs), which are associated with the selected hash units, from the file system management information, and to determine the reading sequence by performing sort processing on the logical sector numbers (LSNs).

6. The information processing system of claim 1, wherein the data processing unit is further configured to randomly select the hash units.

7. An information processing method for verifying a disk-recorded content, comprising acts of:
 selecting hash units, which are objects of collation, from among a plurality of hash units formed with component data items of the disk-recorded content;
 determining an order of a hash-unit reading sequence by sorting recording position information corresponding to disk-recording positions of the selected hash units, the determined order corresponding to a minimum number of inter-layer movements when the selected hash units are arranged in a plurality of layers of the disk;
 reading the selected hash units according to the hash-unit reading sequence; and
 calculating hash values for the respective selected hash units and collating the calculated hash values with collation hash values.

8. The information processing method of claim 7, wherein selecting the hash units comprises randomly selecting the hash units.

9. The method of claim 7, wherein selecting the hash units comprises randomly selecting the hash units.

10. The method of claim 7, wherein determining the order of the hash-unit reading sequence comprises determining the hash-unit reading sequence in a way that minimizes a number of inter-layer movements, if the selected hash units are arranged in a plurality of layers of the disk.

11. The method of claim 7, wherein determining the order of the hash-unit reading sequence comprises determining the order of the hash-unit reading sequence in a way that permits reading of the selected hash units via a movement in either a first direction from an internal circumference of the disk to an external circumference thereof or a second direction from the external circumference of the disk to the internal circumference thereof, if the selected hash units are arranged in a layer of the disk.

12. The method of claim 7, wherein determining the order of the hash-unit reading sequence comprises sorting logical sector numbers (LSNs) associated with the selected hash units.

13. At least one non-transitory computer storage medium having stored thereon a program which, when executed, causes an information processing system to verify a disk-recorded content by, at least in part, performing acts of:
 selecting hash units, which are objects of collation, from among a plurality of hash units formed with component data items of the disk-recorded content;
 determining an order of a hash-unit reading sequence by sorting recording position information corresponding to disk-recording positions of the selected hash units, the determined order corresponding to a minimum number of inter-layer movements when the selected hash units are arranged in a plurality of layers of the disk;
 reading the selected hash units according to the hash-unit reading sequence; and
 calculating hash values for the respective selected hash units and collating the calculated hash values with collation hash values.

14. The medium of claim 13, wherein selecting the hash units comprises randomly selecting the has units.

15. The medium of claim 13, wherein determining the order of the hash-unit reading sequence comprises determining the hash-unit reading sequence in a way that minimizes a number of inter-layer movements, if the selected hash units are arranged in a plurality of layers of the disk.

16. The medium of claim 13, wherein determining the order of the hash-unit reading sequence comprises determining the order of the hash-unit reading sequence in a way that permits reading of the selected hash units via a movement in either a first direction from an internal circumference of the disk to an external circumference thereof or a second direction from the eternal circumference of the disk to the internal circumference thereof, if the selected hash units are arranged in a layer of the disk.

17. The medium of claim 13, wherein determining the order of the hash-unit reading sequence comprises sorting logical sector numbers (LSNs) associated with the selected hash units.

* * * * *